United States Patent [19]
Patnode

[11] 3,823,974
[45] July 16, 1974

[54] FOLDING CAMPER

[76] Inventor: Le Roy K. Patnode, 920 Trout Gulch Rd., Aptos, Calif. 95003

[22] Filed: Jan. 22, 1973

[21] Appl. No.: 325,506

[52] U.S. Cl. .............. 296/23 MC, 296/27, 135/4 A
[51] Int. Cl. ............................................ B60p 3/34
[58] Field of Search .......... 296/23 R, 23 MC, 23 F, 296/23 G, 26, 27; 52/66, 67; 135/1 A, 4 A

[56] References Cited
UNITED STATES PATENTS

| | | | |
|---|---|---|---|
| 3,024,059 | 3/1962 | Hagenson | 296/23 R |
| 3,259,422 | 7/1966 | Canon | 296/27 |
| 3,472,252 | 10/1969 | Siebring | 135/4 A |
| 3,576,344 | 4/1971 | Hansen | 296/23 R |

Primary Examiner—Philip Goodman
Assistant Examiner—John A. Carroll
Attorney, Agent, or Firm—Robert G. Slick

[57] ABSTRACT

A folding camper is described which is sturdy, light in weight and which can be erected easily by a single person. The structure permits maximum utilization of the space inside the camper.

4 Claims, 6 Drawing Figures

PATENTED JUL 16 1974 3,823,974

FOLDING CAMPER

SUMMARY OF THE INVENTION

In recent years camper bodies have become very popular and these are ordinarily mounted on pickup trucks. Since the campers ordinarily extend a substantial distance above the cab of the truck, the conventional camper makes the vehicle top heavy and adds a substantial amount of wind resistance.

To alleviate this condition folding camper bodies have been proposed wherein the body of the camper folds to some extent so that it extends only a slight distance above the cab of the truck. However such structures have not been fully satisfactory, since in the past they have been heavy and cumbersome so that they weigh substantially more than conventional camper bodies. Further, most such structures have been difficult to erect so that ordinarily more than one person is required to go from the folded to the erect position or visa versa. Frequently storage space within the folded camper is restricted by the folding mechanism.

In accordance with the present invention, these difficulties have been obviated by providing a counterbalanced structure wherein the roof of the structure moves upwardly and to the rear of the vehicle when it is erected.

The structure of the present invention is relatively inexpensive to manufacture and is made of sturdy parts so that little maintenance is required. The structure is light in weight so that the vehicle is not top heavy.

All of the mechanical structure is concealed within panels and can be controlled by a single handle which is easily locked so that the structure is substantially tamperproof as well as dust and rainproof.

Another feature of the present invention is that the roof of the camper extends to the rear, providing a rear overhang or backporch.

Still another feature of the present invention is that when the camper structure is in the folded position, substantially all of the body space of the vehicle is utilizable for the storage of the usual camping articles.

Still another feature of the invention is that a delicate counterbalancing system is employed so that the roof can be raised by a single person with little effort.

Various other features and advantages of the invention will be brought out in the balance of the specification.

DESCRIPTION OF THE PREFERRED EMBODIMENT

Figure 1:
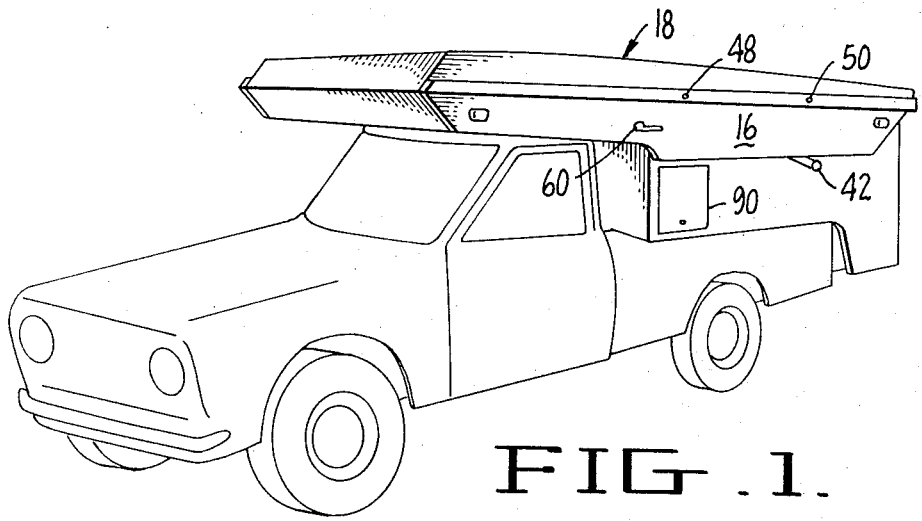
FIG. 1 is a perspective view of a camper embodying the present invention showing it in folded position mounted on a pickup truck.
Figure 2:
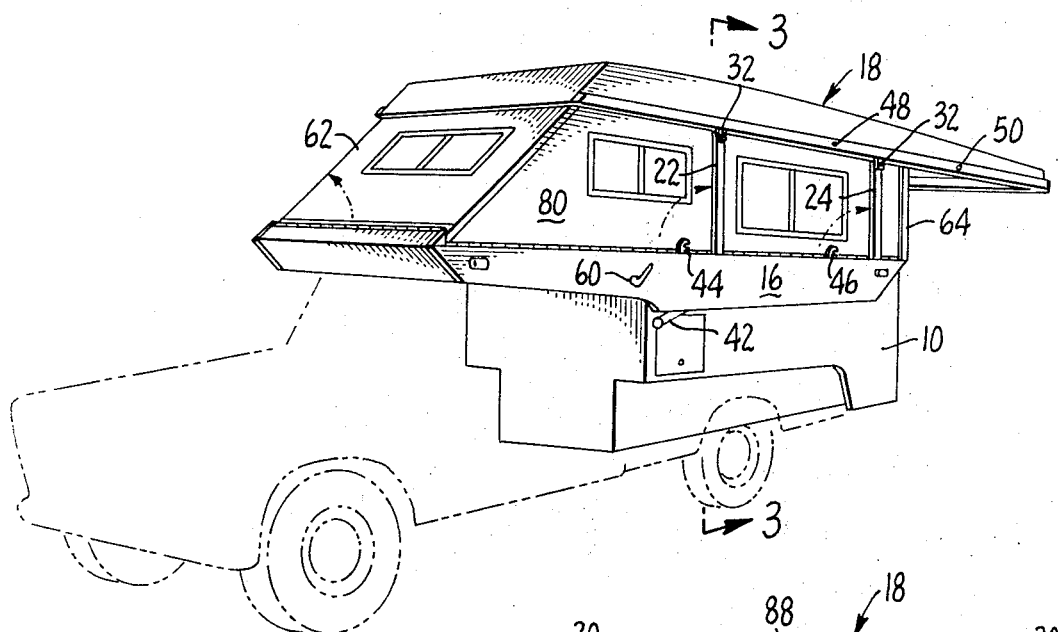
FIG. 2 is a perspective view of the camper in its erected position.
Figure 3:
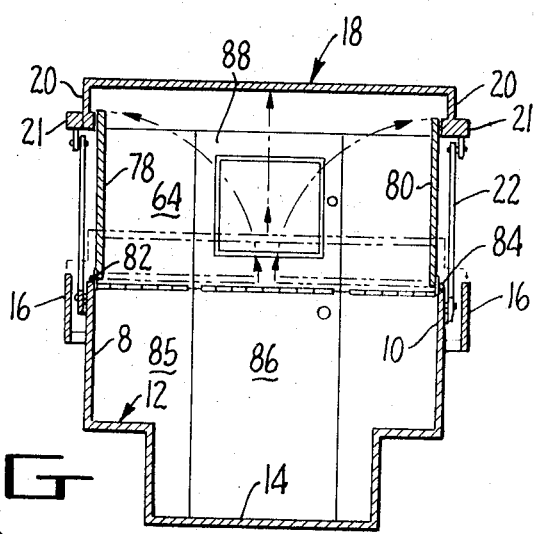
FIG. 3 is a section on the line 3—3 of FIG. 2.
Figure 4:
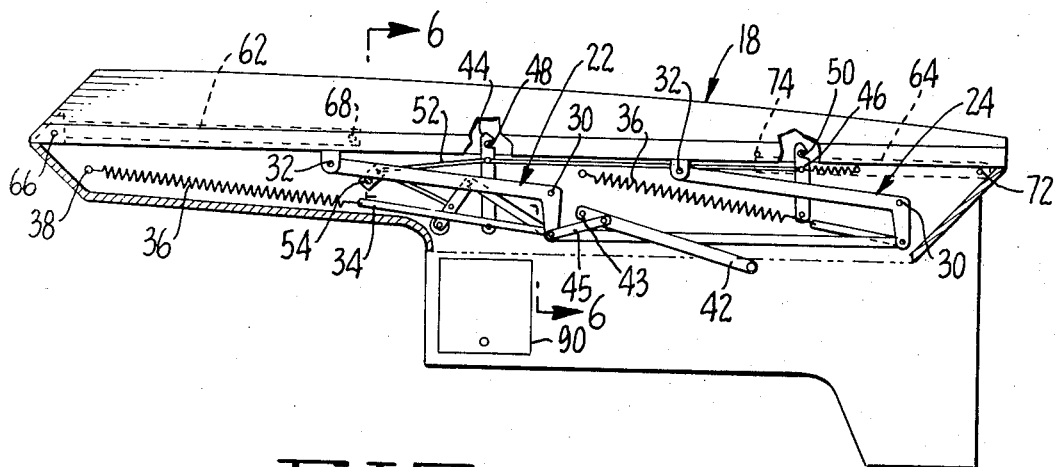
FIG. 4 is an enlarged side view of the camper in folded position with a side panel removed to show the internal structure.

The camper of the present invention has side frame members 8 and 10 which extend downwardly as at 12 to a bottom member 14. Naturally the side members and bottom member will be proportioned to fit the body of the particular truck to which the camper is attached and the bottom member might be eliminated and the side members bolted or otherwise fastened to the sides of the truck. However, it is ordinarily preferred to make such campers as an integrated unit so that the camper can be easily dismounted, permitting the truck to be used for other purposes.

The side members 8 and 10 form the foundation for the mechanical parts of the folding camper and the side members are ordinarily provided with removable, decorative panels 16 spaced outwardly from the side members which serve to conceal the mechanical structure when the camper is in the closed position and to provide a pleasing, streamlined appearance to the structure.

A roof member generally designated 18 having depending side members 20 with molding 21 is employed. The roof member 18 is supported on four bell cranks only two of which, designated 22 and 24, are described in detail. The two bell cranks on the opposite side of the vehicle are mirror images of the cranks 22 and 24. Each of the bell cranks has a long arm 26 and a short arm 28 and is pivoted on the side members on shaft 30. The long arm 26 of each of the bell cranks is pivoted to a roof bracket 32. The short arm 28 of the bell cranks is fastened through a linkage 34 to a spring 36. The opposite end of the spring is attached to the frame member 8 at point 38. As can best be seen in FIG. 6, each of the shafts 30 extends through the body of the camper to the mating bell crank on the opposite side so that any motion given to one bell crank is immediately communicated to the other. Further, a connecting link 40 connects the short arms of the bell cranks on each side of the body so that all of the cranks must operate in unison.

The camper is provided with a handle 42 for use in raising or lowering the top. This is pivoted at point 43 and link 45 connects the handle to the short arm of bell crank 22. Preferably a locking mechanism is provided in the form of four hooks, two of which 44 and 46 are on the near side of the vehicle while corresponding hooks are provided on the off side of the vehicle, not shown. The hooks 44 and 46 are adapted to engage pins 48 and 50 located inside the roof structure. Hooks 44 and 46 are connected through rod 52 to the locking mechanism 54. Locking mechanism 54 is pivoted on rod 56 which extends to the opposite side of the camper to operate the corresponding hooks on that side. Locking mechanism 54 also is connected to linkage 58 which is connected to the short arms of the bell cranks. The locking mechanism 54 has an external handle 60. In this manner the locking mechanism 54 not only locks the four hooks which engage the roof pins, but also locks the four bell cranks. By locking the handle 60, one can lock the top in closed position.

Figure 5:
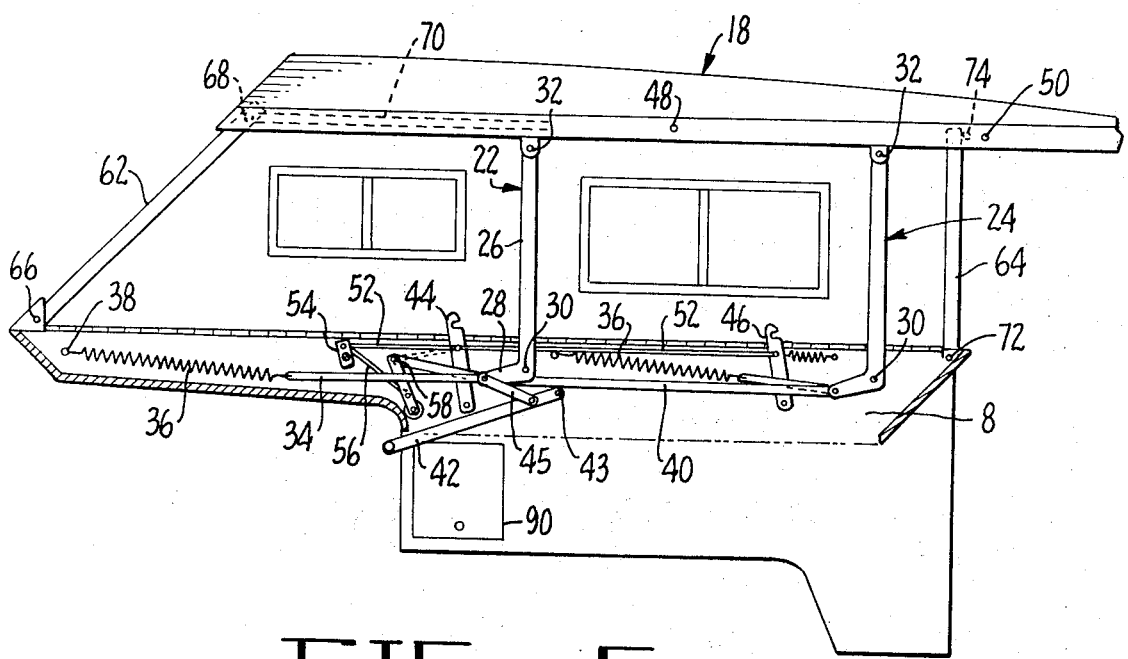
FIG. 5 is a view similar to FIG. 4, showing the roof in a raised position.

The camper body is provided with a front panel 62 and a rear panel 64. Both of these panels erect automatically as the top is raised. The front panel 62 is pivoted at 66 and the top of this panel is provided with pins 68 which extend outwardly from each side of the panel and are adapted to slide in grooves 70 in the top. The rear panel 64 is pivoted at points 72 and 74 forming a parallelogram with the long arms of the bell cranks. When the top is in the down position, panels 62 and 64 are folded inwardly toward each other and as the top raises and moves to the rear, the front and rear panels swing up and away from each other and into the position best seen in FIG. 5.

Side panels 78 and 80 are hinged respectively at 82 and 84 and after the top has been raised, these panels are merely pushed to an upright position and may be held by suitable fasteners, not shown.

The rear solid wall 85 of the camper has a separate door 86, while the rear panel 64 has a mating door section 88. When the camper is in the closed position, the door 86 may nevertheless be opened to allow access to the interior of the vehicle. When the top of the camper is raised, a split or dutch door is formed so that both sections 86 and 88 can be opened or closed together or either one may be operated separately. In addition, a side door 90 can be provided for access to the contents of the camper when the top is in the down position and this opening can also be used for ventilation when the top is up.

Figure 6:
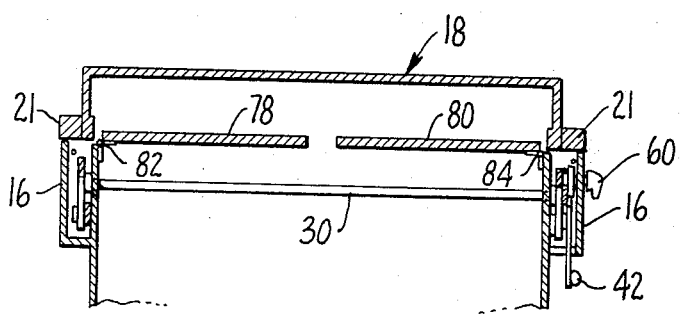
FIG. 6 is a section on the line 6—6 of FIG. 4.

It will be seen, particularly with reference to FIGS. 1 and 6, that when the top is down, the molding 21 forms a tight fit with the members 16 so that dust and rain are effectively sealed out and also all of the mechanism is concealed making the camper tamperproof.

Erection of the camper is extremely simple. One first turns the handle 60, releasing the hooks 44 and 46, and the corresponding hooks on the opposite side, from the top pins and at the same time this releases the four bell cranks. One now merely grasps the handle 42 and pulls it to the front and, because of the counterbalancing effect of the springs 36, very little force is required. As the top is raised, the front and rear panels 62 and 64 automatically swing upwardly and away from each other into their upright position. Now it is only necessary to step inside the camper and raise the panels 78 and 80 to complete the structure. As can be seen, a portion of the roof extends to the rear, forming an effective porch or shelter at the rear of the camper. At the same time, the interior of the camper is substantially unobstructed. To take down the camper it is only necessary to reverse the steps, first lowering the panels 78 and 80 and then pulling down on the handle 42.

Although the camper has been described as being destined for use with a pickup truck, it is obvious that the structure could be used with other vehicles such as an extendable top structure for a trailer.

Although certain specific details have been described showing a preferred embodiment of the invention, many variations can be made without departing from the spirit of this invention. For instance, the front and rear panels have been shown as being self-erecting as the top is raised but these could be individually raised by hand if a simpler structure is desired. Bell cranks are preferably employed to raise and lower the roof but ordinary pivoted arms could be used with other counter balancing means. The side members have been described as being in one place but they might be divided into two or more segments for ease in handling. Many other variations will be apparent to those skilled in the art.

I claim:

1. A folding camper or the like adapted to be mounted on a vehicle such as a pickup truck or the like, comprising a generally rectangular frame having two sides, a front and a back, a roof supported on the frame and of substantially the same size as the frame, and opposite side panels to enclose the space beneath the roof when the roof is elevated, substantially L-shaped bell crank supports connected between the frame and roof to raise and lower the roof and to support the roof in an elevated position, said bell crank supports each including a long arm pivoted at one end to the roof and a short arm extending angularly from the other end of the long arm, said bell crank supports pivotally connected to the frame at the juncture of the long arm and short arm, spring means connected to the extremity of the short arm tending to pivot said long arm to an upright position, said bell crank supports interconnected for movement in unison, lever means connected with the extremity of the short arm of one of the bell crank supports to rotate said bell crank supports about their pivotal connection with the frame to an upright position and to a lowered position, latch means pivotally connected to the frame means and operatively connected to the bell crank supports to lock said supports against operation and engagable with cooperating means on the roof to latch said roof in a lowered position when the latch is in one operative position, and lever means connected with the latch means to operate the latch means to selectively lock said bell crank supports against movement and to latch said roof in a lowered position.

2. The structure of claim 1 wherein said camper includes front and rear panel members, said front panel member being pivoted at the front of said frame and having sliding means attaching the top of said front panel member to said roof member, said rear panel member being pivoted to the rear of said frame at the bottom thereof and to the roof member at the top thereof whereby said front and rear panel members will lie between said roof member and said frame when the roof member is in the lowered position and whereby said panel members will erect and form front and back structures when said roof is in said elevated position.

3. The structure of claim 1 wherein two pairs of bell cranks are employed, two on each side of said frame and wherein the pivot for the connection between said bell cranks and said frame constitutes a shaft connecting cranks on opposite sides of said camper whereby actuating one bell crank will actuate the mating bell crank on the opposite side.

4. The structure of claim 1 wherein said side panels are hinged along their bottom edges to said frame and are adapted to swing inwardly and lie against said frame when said roof is in the lowered position and are adapted to swing upwardly and form sides of said camper when said roof member is in the elevated position.

* * * * *